United States Patent [19]

Croll

[11] Patent Number: 5,010,392
[45] Date of Patent: Apr. 23, 1991

[54] METHOD OF AND APPARATUS FOR RECEIVING HIGH DEFINITION TELEVISION SIGNALS

[75] Inventor: Michael G. Croll, Horsham, United Kingdom

[73] Assignee: British Broadcasting Corporation, London, England

[21] Appl. No.: 386,785

[22] Filed: Jul. 28, 1989

[30] Foreign Application Priority Data

Jul. 28, 1988 [GB] United Kingdom ............... 8817978
Jul. 28, 1988 [GB] United Kingdom ............... 8817979

[51] Int. Cl.$^5$ .................. H04N 11/22; H04N 9/64
[52] U.S. Cl. ......................... 358/21 R; 358/11
[58] Field of Search ............................. 358/11, 21 R

[56] References Cited

U.S. PATENT DOCUMENTS 4,335,393  6/1982  Pearson ........................... 358/11
4,665,427  5/1987  Beckley et al. ................... 358/11

FOREIGN PATENT DOCUMENTS 0003169  1/1979  European Pat. Off. .
0111157  11/1983 European Pat. Off. .

OTHER PUBLICATIONS

Iinuma et al., Interframe Coding for 4 MHz Color Television Signals, IEEE Transactions on Comunications vol. COM-23, No.12, Dec. 1975, pp. 1461-1465.
Rhodes, Time Division Multiplex of Time Compressed Chrominance for A Compatible High Definition Television System, IEEE Transactions on Consumner Electronics, vol. CE-28, No. 4, Nov. 1982, pp. 592-601.
Rundfunk- und Fernsehtechnik Morgen, *Ferneseh-Und Kino-Technik*, 41 Jahrgang, Nr. 11/1987, pp. 501-503.

Primary Examiner—John W. Shepperd
Attorney, Agent, or Firm—Robert F. O'Connell

[57] ABSTRACT

An enhanced definition PAL signal (HD-PAL) may be received by a MAC receiver by decoding the signal received with a simple PAL decoder (10), time compressing the luminance and chrominance components of the decoded signal and encoding them in a MAC format (12). The MAC signal is then decoded using an HD-MAC decoder (14) and the signals are expanded by a post processor (16) prior to display.

23 Claims, 3 Drawing Sheets

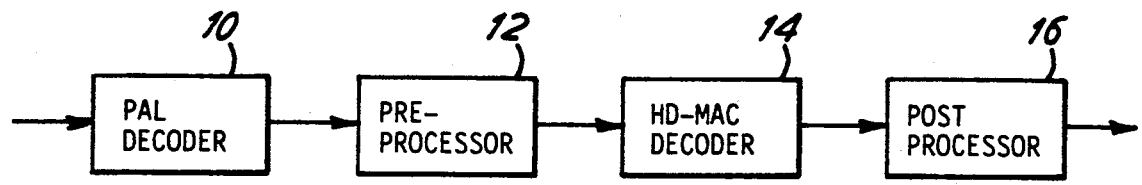
FIG. 1 ARRANGEMENT OF BASIC UNITS OF RECEIVER
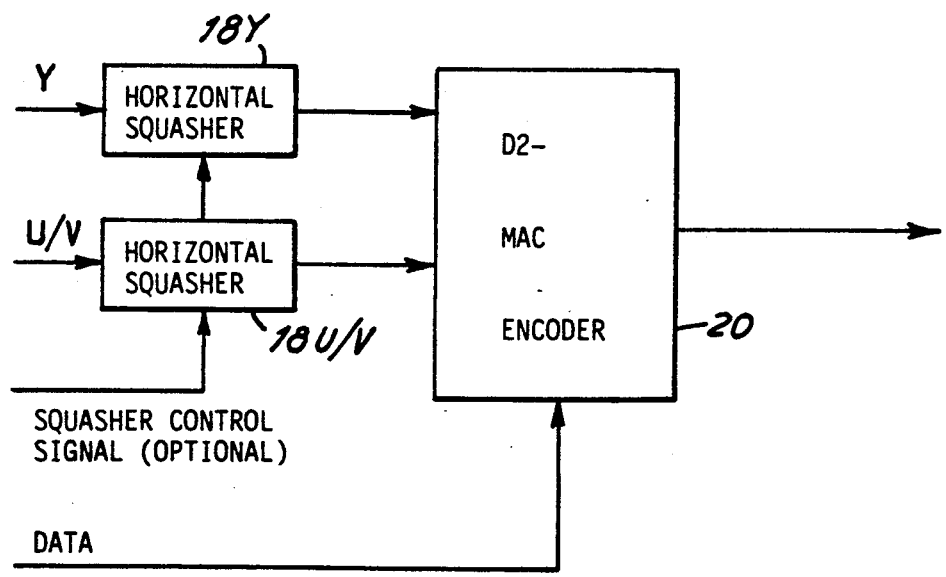
FIG. 2

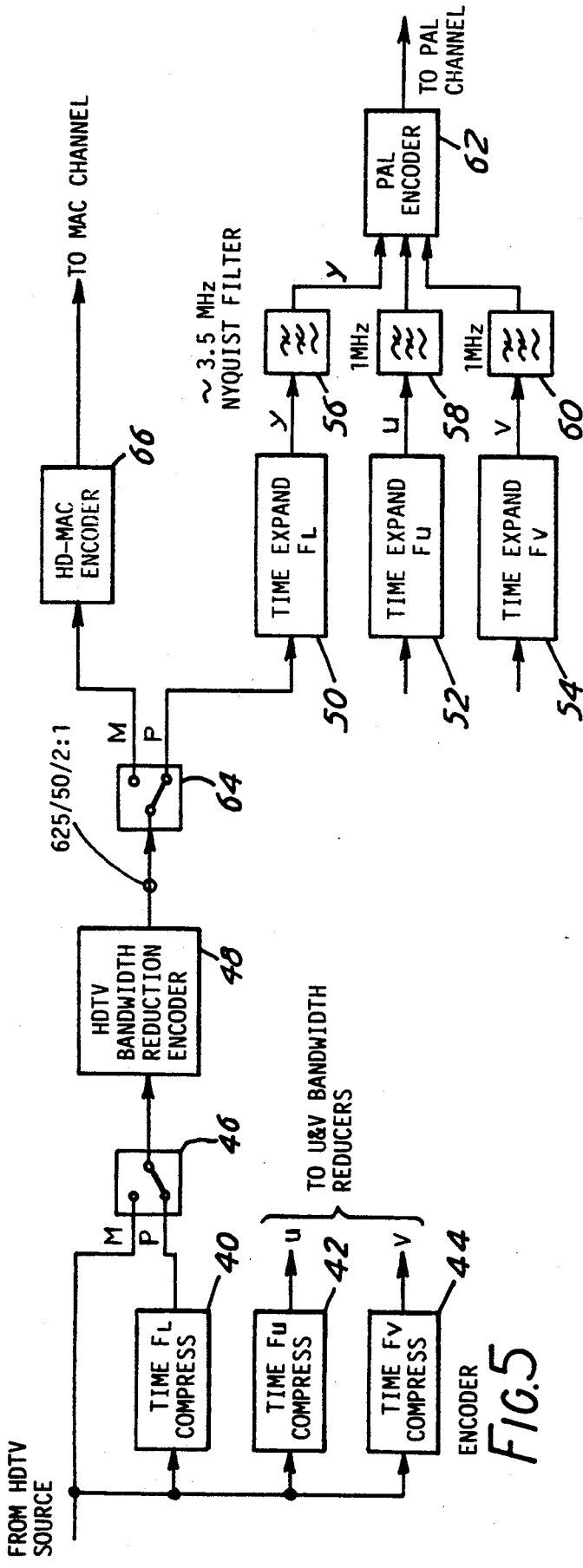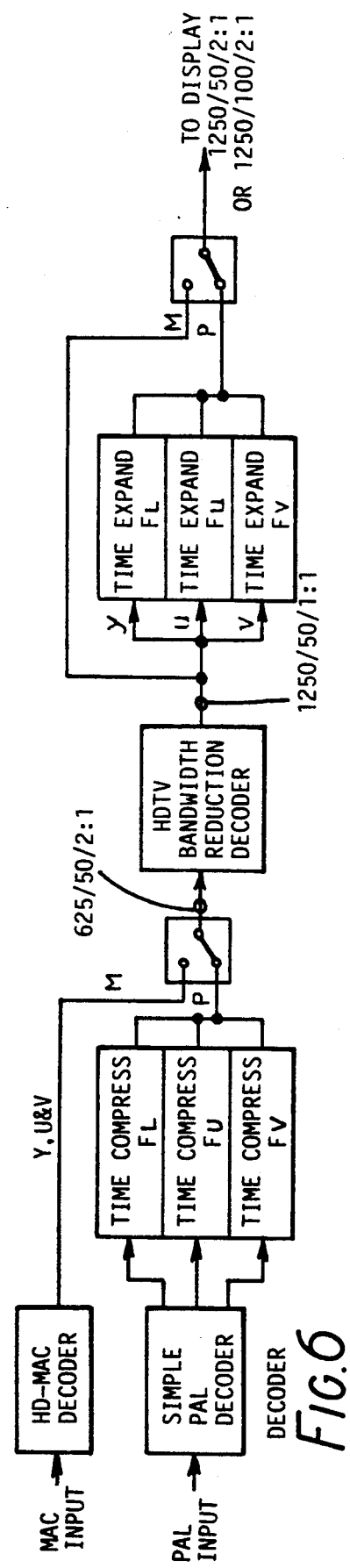

METHOD OF AND APPARATUS FOR RECEIVING HIGH DEFINITION TELEVISION SIGNALS

BACKGROUND OF THE INVENTION

This invention relates to high definition televison, and in particular to the reception of signals transmitted over different types of transmission channels. The invention is particularly concerned with the reception of frequency multiplexed signals such as PAL or HD-PAL by a receiver designed for reception of time multiplexed signals such as MAC or HD-MAC.

It has been recognised that the introduction of a compatible television service provided via direct broadcasting satellites or other methods of delivering uses a PAL composite method of conveying the colour signal which is not directly compatible with MAC and its derivatives.

In the conventional PAL signal, luminance and colour signals are frequency multiplexed for transmission. By contrast, MAC signals are time multiplexed for transmission and, when separated, give a greater horizontal signal bandwidth than is available with PAL terrestrially broadcast signals. MAC gives an 8 MHz luminance bandwidth whereas PAL may only give 3.5 MHz useable luminance bandwidth at the output of a PAL decoder. By applying complex decoders to the PAL signal, up to 5.5 MHz may be derived.

If an HD-MAC signal were to be transmitted via PAL the additional frequencies derived in the HD-MAC decoder would not be useable because there would be a large gap in the middle of the spectrum. The reason for this is that for a still picture, horizontal frequencies up to 16 MHz are coded into an effective 8 MHz bandwidth by folding them about the 8 MHz frequency. The signal is unfolded in the HD-MAC decoder, and it is vital that the full 8 MHz bandwidth is available at the HD-MAC decoder. However, if the signal is constrained in the communication path such that, for example, 3.5 MHz is available in the luminance channel of the HD-MAC decoder, the unfolded spectral components are only present from 0 to 3.5 MHz and from 12.5 MHz to 16 MHz. In this case, the higher-frequency components are of no value in enhancing the resolution of the picture because of the gap in the middle of the spectrum. Components in the band 3.5 MHz to 7 MHz would, however considerably enhance the resolution of the picture.

SUMMARY OF THE INVENTION

The present invention aims to provide a method of and apparatus for receiving a television signal which will enable signals transmitted in different formats to be received. This aim is realised by a method of receiving high definition television signals transmitted in a first signal format, comprising receiving the signals and decoding with a decoder compatible with the first signal format, processing the signals by reformatting and encoding in a second signal format, decoding the re-encoded signal with a decoder compatible with the second signal format and displaying the information conveyed by the signal.

Preferably, the decoded signal is time compressed prior to re-encoding and time expanded after the second decoding operation.

The invention also provides a receiver for receiving high definition television signals transmitted in a first signal format, comprising means for receiving and decoding the signal, processing means for reformating the decoded signal and encoding the signal in a second signal format, means compatible with the second signal format for decoding the re-encoded signal, and means for displaying the information conveyed by the signal.

In a preferred embodiment of the invention, the separated luminance and chrominance signals of colour video signals are time compressed and MAC decoded such that the bandwidths of these components match the bandwidths of the normal HD-MAC signals at a HD-MAC coder, and the output of the HD-MAC decoder is time expanded to fill the video display. The transmission method may be any of the normal methods of broadcasting including PAL and SECAM at 50 Hz field rate and NTSC at 60 Hz field rate, or VHS, Beta or any other method for distributing pre-recorded video signals. The method is also applicable to other high definition approaches such as MUSE (see NHK Laboratory Note No. 304, Ninomiya et al, 1980).

In a preferred example to be described, the outputs from a PAL luminance channel confined to 3.5 MHz and a PAL chrominance channel rendered clean by not overlapping their spectra at the coder or decoder, i.e. approximately 3.5 MHz of luminance and 1.0 MHz of chrominance, can be decoded by an HD-MAC decoder, preferably of the type proposed for the BBC Eureka 1988 or 1989 coding algorithms (see our UK Patent Application No. 88 14822.6, published as U.S. Pat. No. 2,221,367).

In the method to be described the normal HD-MAC decoder is used without modification, the idea being that the compatible evolution of television standards is not impeded. In fact it is possible to achieve benefits by applying the HD-MAC decoder to any signal delivered via the PAL route so long as it has been coded to include the necessary additional picture detail in a form similar to HD-MAC.

BRIEF DESCRIPTION OF THE DRAWINGS

Embodiments of the invention will now be described, by way of example only, and with reference to the accompanying drawings in which:

FIG. 1 shows, schematically, the basic components of a receiver embodying the invention;

FIG. 2 shows, in greater detail, the pre-processor of FIG. 1;

FIG. 5 shows, schematically an encoding system for selecting between MAC and PAL signals; and FIG. 6 shows a decoder for the encoder of FIG. 5.

DETAILED DESCRIPTION OF THE PREFERRED EMBODIMENTS

Figure 3:
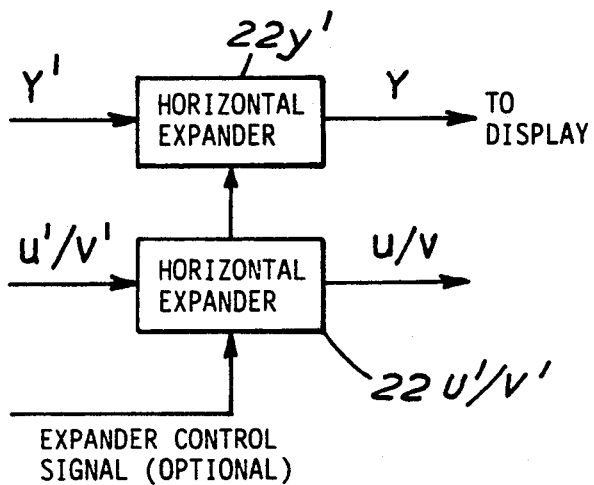
FIG. 3 shows, in greater detail, the post-processor of FIG. 1.

FIG. 1 shows the basic units of the receiver. A received PAL standard signal is decoded by a PAL decoder 10. The decoded output is then processed by pre-processor 12. The pre-processor 12 compresses the PAL decoded signal horizontally by an amount determined by the ratio between the luminance signal bandwidth achieved with the PAL system and the horizontal frequency around which the HD-luminance component of the MAC signal is folded. A similar process is applied to the chrominance signals. The compressed luminance signals are applied in simple form to a MAC coder within the pre-processor 12 such that the time multiplexed form of the MAC signal is coded. That signal is then applied to an HD-MAC decoder 14 which is that which has been optimised for the MAC transmitted signal. The output of the decoder 14 is further processed in a post-processor 16 to restore the correct active signal durations by applying a horizontal expansion of the inverse compression ratio used in the pre-processor.

The pre-processor 12 is shown in more detail in FIG. 2 and comprises a horizontal compressor or squasher 18Y, 18 U/V for each of the luminance and chrominance components of the PAL decoded signal. The output of each squasher 18Y, 18 U/V is fed to a D2-MAC encoder 20 which outputs a signal in D2-MAC format to the decoder 14 of FIG. 1.

The post-processor 16 is illustrated in FIG. 3 and comprises a horizontal expander 22Y;22U'/V' for the HD-MAC decoded horizontally compressed luminance and chrominance components Y',U'/V' which outputs luminance and chrominance signals Y and U/V of normal active signal durations for display.

The degree of compression and expansion applied by the horizontal squashers 18Y, 18U/V and the horizontal expanders 22Y', 22U'/V' can be controlled by a control signal. Control of the compression and expansion is necessary where the signal received may have been transmitted via one of several forms of the PAL path, for example via the UK system I, the European narrow bandwidth path or via a recorder which may substantially limit the bandwidth. The provision for receiving a control signal greatly increases the versatility of the receiver.

Figure 4:
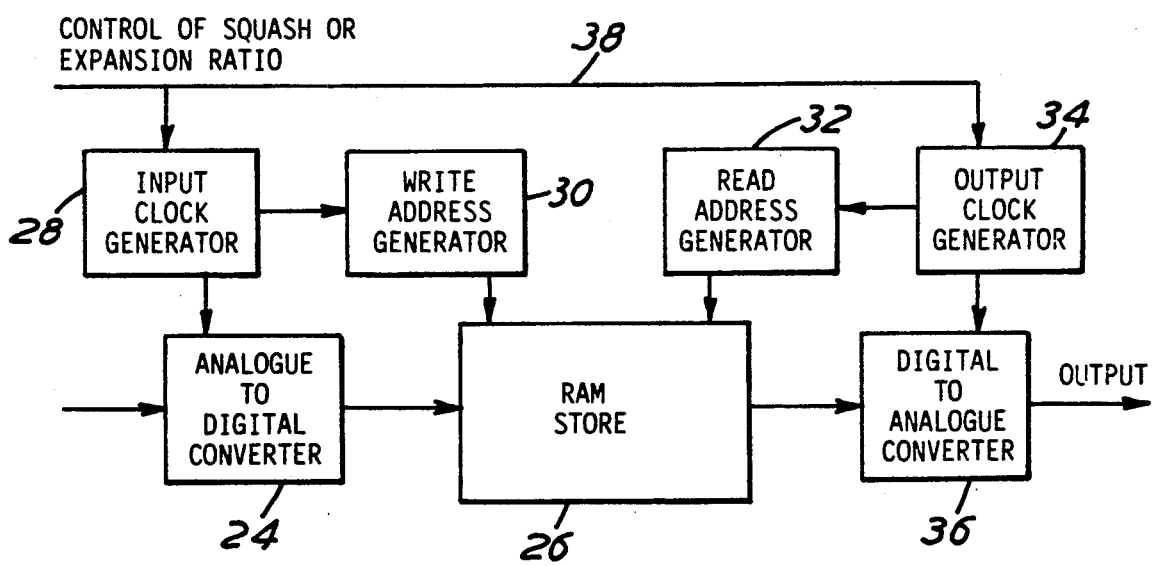
FIG. 4 shows, in block form, the squasher or expander of FIGS. 2 and 3.

FIG. 4 shows a circuit for squashing or expanding the luminance or chrominance signals; that is, a circuit suitable for use with the horizontal squash or horizontal expand circuits 18, 22 of FIGS. 2 and 3. The signal to be operated on is converted into digital form by ADC 24, and is then stored in Random Access Store 26. The conversion rate of the ADC 24 is controlled by a clock 28 which in turn controls a write address generator 30 in order that each sample output from ADC 24 is stored at a unique location in RAM 26.

Retrieval of the stored digitised signal from RAM 26 is the inverse of storage process; a read address generator 32 controlled by an output clock generator 34 addresses each memory location in turn to output the contents of the location of DAC 36. The DAC, which is also controlled by output clock generator 36 outputs a squashed or expanded analogue signal.

The nature and degree of the operation performed by the circuit of FIG. 4 depends on the control signal on line 38 which controls the input and output clock generators 28 and 34. The control signal controls the differential clock rates of the two generators when the clock rate of input generator is higher than the rate of the output generator the signal is expanded and when the input, or write clock rate is lower than the output write clock rate the signal is squashed. When the signal is squashed, the remaining time of the active portion of the signal is filled with a blanking signal. This ensures that the memory address circuits can be reset after each television line so that the squashing does not affect the relative vertical positions of the picture information.

FIG. 5 and 6 illustrate an extension of the principle of the receiver of FIGS. 1 to 4. This embodiment shows how an encoder (FIG. 5) and a decoder in a reciver (FIG. 6) can be arranged to encode/decode a PAL or MAC type signal. Where the signal is to be transmitted in HD-MAC format on a MAC channel no further squashing or expanding of the signal components is required so that the signal is encoded on a separate path which may be selected in both the encoder and the decoder. The embodiment of FIGS. 5 and 6 envisages an HDTV source and makes use of bandwidth reduction techniques which are described in our co-pending application GB No. 8817979 published as U.S. Pat. No. 2,221,813 and corresponding to U.S. patent application Ser. No. 387,022 filed July 28, 1989.

Referring now to FIGS. 5 and 6, HDTV source, which may be a 1250/50/2:1 source is time compressed for each of its Y, U and V components in time compressor 40, 42 and 44. Each of the time compressed components form one input to a respective two position switch 46 (only one of which is shown), the other input of which is the uncompressed HDTV component. A HDTV bandwidth reduction encoder 48 of the type described in WO87/04034 (U.S. patent application Ser. No. 90,584 filed Oct. 5, 1987) and WO87/05770 (U.S. Pat. No. 4,873,573) bandwidth reduces the output from the switch 46 and produces a 625/50/2:1 standard output. Thus, when switch 46 is in position 'M' in FIG. 5, the bandwidth reducer is used to feed a high definition MAC channel and the reducer 48 accepts a 1250 line interlaced or sequential source picture and delivers a bandwidth reduced version packaged as a 625 line interlaced signal suitable for normal MAC encoding. In position 'P' of switch 48 the input signals are then sample rate changed and compressed in time at the input to the bandwidth reducer and expanded at the output in expansion units 50, 52, 54. This operation is as described with reference to FIGS. 1 to 4. The effect of this operation is to move the horizontal folding frequency used within the HDTV bandwidth reducer to the frequency required for clean PAL encoding as described in above mentioned application GB No. 8817979 with the luminance and chrominance signals separated. The time expanded components are filtered through Nyquist filters 56, 58 and 60 to bandwidth reduce the Y and U/V signals and fed to a PAL encoder 62 for transmission via a standard PAL channel.

When position M is selected for switch 46 and the corresponding selection switch 64 on the output side of the bandwidth reducer 48, the bandwidth reduced signal is fed directly to an HD-MAC encoder 66 in 625/50/2:1 format for transmission via a MAC channel.

The decoder shown in FIG. 6 is the inverse of the encoder in order to allow an HDTV decoder and display to be used for decoding and displaying HD-PAL. If the HDTV coding system is non-compatible, such as the MUSE system described in NHK laboratory No. 304 by Ninomaya et al, entitled "A single Channel HDTV Broadcast System—The Muse" some form of sampling will be necessary to make NTSC encoding possible. A suitable system is described in our application No. GB 2194409 (U.S. Pat. No. 4,884,138).

A receiver embodying the invention has the advantage that, in the event of a substantial market penetration by an HDTV based bandwidth reduction system, the same receiver hardware can be used, at least in part, to decode HD-PAL. The compatibility of such a system, that is the picture quality produced by the normal PAL decoder, is likely to be poorer than that available from a bandwidth reduction system specifically designed for a PAL only environment, since there is likely to be sample interleaving for transmission and a fourfold spectrum folding.

The receiver system described above requires that the signal is coded to include the HD-MAC characteristics taking into account the bandwidth of the channel available to convey it. A channel to the receiver must also be arranged to convey DATV information and any control signals to indicate to the receiver the ratios of bandwidth that have been assumed. The HD-MAC coder can be specially constructed to include the correct folding frequencies or it could be a standard HD-MAC encoder surrounded by the same kind of pre-processing and post-processing as suggested here for the receiver.

Given these, it is anticipated that enhanced resolution signals can be provided via a wide range of television broadcasting and record/replay systems both for entertainment and for industrial purposes. The benefit of using unmodified domestic decoding circuitry enables very sophisticated processing to be applied without the need to redevelop such circuits.

The main benefit to the viewer of the proposed approach is that using the techniques suggested a wider range of programme material may be available to be displayed at higher quality when the viewer decides to take advantage of the higher technical quality available and equip himself with a new form of receiver.

The benefit to the broadcaster of adopting such techniques is that programmes broadcast or distributed via the already established methods may be developed compatibly in such a way that it is not necessary to maintain both a new and an old method of programme distribution but to upgrade progressively the technical quality of the existing services.

I claim:

1. A method of receiving high definition television signals transmitted in a first signal format, comprising:
   receiving the signals and decoding with a first decoder compatible with the first signal format to provide first decoded luminance and chrominance components;
   time compressing the decoded luminance and chrominance components under the control of a control signal which determines the degree of time compression;
   decoding the time compressed signals with a second decoder compatible with the time compressed signal to provide decoded time compressed signals;
   time expanding the decoded time compressed signals under the control of the control signal, the control signal determining a degree of time expansion substantially equal to the degree of time compression; and
   displaying or recording the information conveyed by the time expanded signals.

2. A method according to claim 1, wherein the processing of the decoded signal comprises adjusting the bandwidth of the luminance and chrominance components of the signal to match the bandwidth of the components when encoded in the second signal format.

3. A method according to claim 1, in which the luminance and chrominance components are time compressed by substantially an amount determined by the ratio between the luminance signal bandwidth in the first signal format and a horizontal frequency around which the luminance component is folded in the second signal format.

4. A method according to claim 1, wherein the signal is compressed or expanded by writing signal data into a store at a first rate and reading data from the store at a second rate.

5. A method according to claim 4, wherein the read and write rates are variable.

6. A method according to claim 1, wherein the first signal format is a frequency multiplexed format and the second signal format is a time multiplexed format.

7. A receiver for receiving high definition television signals transmitted in a first signal format, comprising:
   means for receiving and decoding the signal to provide first decoded luminance and chrominance components;
   means for time compressing the decoded luminance and chrominance components under the control of a control signal which determines the degree of time compression;
   means compatible with the time compressed signals for decoding the time compressed signals to provide decoded time compressed signals;
   means for time expanding the decoded time compressed signals under the control of the control signal, the control signal determining a degree of time expansion substantially equal to the degree of time compression; and
   means for displaying or recording the information conveyed by the time expanded signals.

8. A receiver according to claim 7, wherein the processing means comprises means for adjusting the bandwidth of the components of the decoded signal to match the bandwidth of the components when encoded in the second signal format.

9. A receiver according to claim 7, wherein the time compression and time expansion means each comprises a store means for writing data into the store at a first rate and means for reading data from the store at a second rate.

10. A receiver according to claim 9, comprising means for varying the read and write rates.

11. A receiver according to claim 7, wherein the means for decoding the first signal format comprises means for decoding a frequency multiplexed signal and the means for decoding the second signal format comprises means for decoding a time multiplexed signal.

12. Apparatus according to claim 7, in which the luminance and chrominance components are time compressed by substantially an amount determined by the ratio between the luminance signal bandwidth in the first signal format and a horizontal frequency around which the luminance component is folded in the second signal format.

13. A receiver according to claim 7 comprising further receiving and decoding means for receiving and decoding a transmitted time compressed signal, and switch means selectively movable between a first position in which the means for decoding time compressed signals operates on said received and decoded time compressed signal, and a second position in which the means for decoding time compressed signals operates on the time compressed decoded luminance and chrominance components of the signal received in said first signal format.

14. A method of receiving high definition television signals transmitted in a first signal format, comprising:
   receiving the signals and decoding with a first decoder compatible with the first signal format to provide decoded signals;

time compressing the decoded signals by writing data into a store at a first rate and reading data from the store at a second rate, the read and write rates being variable;

decoding the time compressed signals with a second decoder compatible with the time compressed signal to provide decoded time compressed signals;

time expanding the decoded time compressed signals, the degree of time expansion being substantially equal to the degree of time compression; and displaying or recording the information conveyed by the time expanded signals.

15. A method of receiving high definition television signals transmitted in a first signal format, comprising:

receiving the signals and decoding with a first decoder compatible with the first signal format to provide decoded signals;

time compressing the decoded signals;

decoding the time compressed signals with a second decoder compatible with the time compressed signal to provide decoded time compressed signals;

time expanding the decoded time compressed signals by writing data into a store at a first rate and reading data from the store at a second rate, the read and write rates being variable, the degree of time expansion being substantially equal to the degree of time compression; and displaying or recording the information conveyed by the time expanded signals.

16. A receiver for receiving high definition television signals transmitted in a first signal format, comprising:

means for receiving the signals and for decoding with a first decoder compatible with the first signal format to provide decoded signals;

means for time compressing the decoded signals comprising a store and means for writing data into a store at a first rate and reading data from the store at a second rate, the read and write rates being variable;

means for decoding the time compressed signals with a second decoder compatible with the time compressed signal to provide decoded time compressed signals;

means for time expanding the decoded time compressed signals, the degree of time expansion being substantially equal to the degree of time compression; and means for displaying or recording the information conveyed by the time expanded signals.

17. A receiver for receiving high definition television signals transmitted in a first signal format, comprising:

means for receiving the signals and decoding with a first decoder compatible with the first signal format to provide decoded signals;

means for time compressing the decoded signals;

means for decoding the time compressed signals with a second decoder compatible with the time compressed signal to provide decoded time compressed signals;

means for time expanding the decoded time compressed signals, comprising a store and means for writing data into a store at a first rate and reading data from the store at a second rate, the read and write rates being variable, the degree of time expansion being substantially equal to the degree of time compression; and means for displaying or recording the information conveyed by the time expanded signals.

18. A method of receiving high definition television signals transmitted in a first signal format, comprising receiving the signals and decoding with a decoder compatible with the first signal format to provide decoded signals, processing the decoded signals by reformating and encoding in a second signal format, decoding the re-encoded signal with a decoder compatible with the second signal format, and displaying the information conveyed by the signal, wherein the processing of the decoded signal comprises adjusting the bandwidth of the luminance and chrominance components of the signal to match the bandwidth of the components when encoded in the second signal format.

19. A method according to claim 18, in which the luminance and chrominance components are time compressed by substantially an amount determined by the ratio between the luminance signal bandwidth in the first signal format and a horizontal frequency around which the luminance component is folded in the second signal format.

20. A method according to claim 19, wherein the first signal format is a frequency multiplexed format and the second signal format is a time multiplexed format.

21. A receiver for receiving high definition television signals transmitted in a first signal format, comprising means for receiving and decoding the signal to provide decoded signals, processing means for reformating the decoded signals and encoding the signal in a second signal format, means compatible with the second signal format for decoding the re-encoded signals, and means for displaying the information conveyed by the signal, wherein the processing means comprises means for adjusting the bandwidth of the components of the decoded signal to match the bandwidth of the components when encoded in the second signal format.

22. A receiver according to claim 21, in which the luminance and chrominance components are time compressed by substantially an amount determined by the ratio between the luminance signal bandwidth in the first signal format and a horizontal frequency around which the luminance component is folded in the second signal format.

23. A receiver according to claim 22, wherein the means for decoding the first signal format comprises means for decoding a frequency multiplexed signal and the means for decoding the second signal format comprises means for decoding a time multiplexed signal.

* * * * *